Aug. 11, 1959  J. J. ZACH  2,898,869
NARROW GAUGE RAILWAY TRUCK

Filed Nov. 6, 1956  3 Sheets-Sheet 1

*INVENTOR.*
JULIUS J. ZACH
BY
ATTORNEY

Aug. 11, 1959   J. J. ZACH   2,898,869
NARROW GAUGE RAILWAY TRUCK
Filed Nov. 6, 1956   3 Sheets-Sheet 2
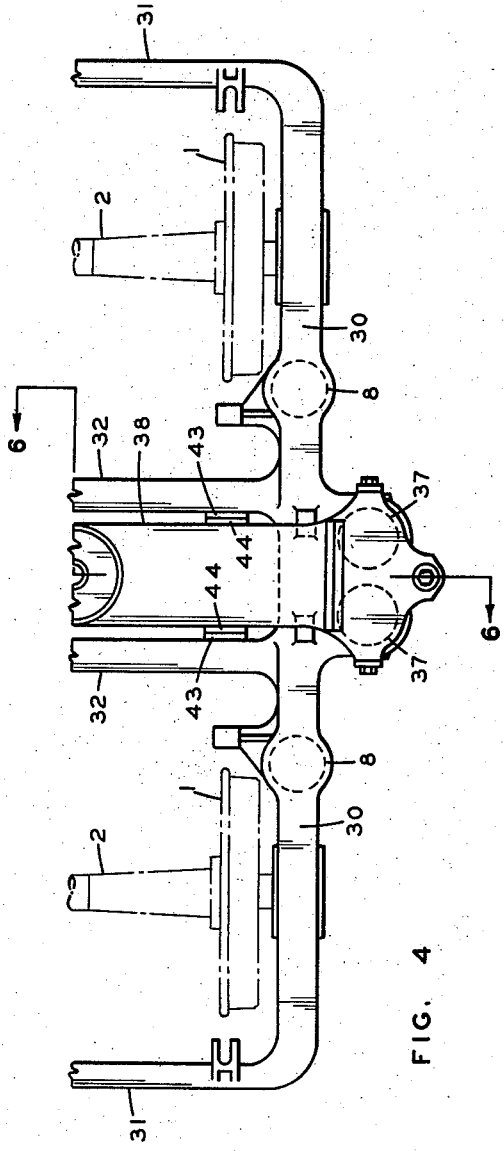
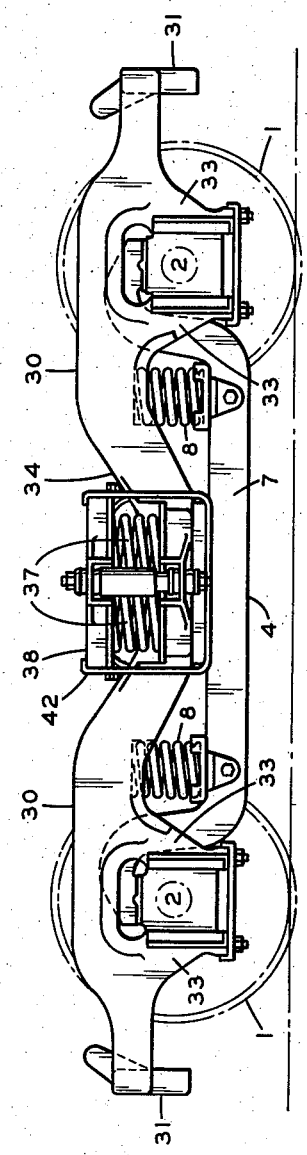
INVENTOR.
JULIUS J. ZACH
BY
*Francis Travers Burgess*
ATTORNEY Aug. 11, 1959  J. J. ZACH  2,898,869
NARROW GAUGE RAILWAY TRUCK
Filed Nov. 6, 1956  3 Sheets-Sheet 3

INVENTOR.
JULIUS J. ZACH
BY
Francis Travers Burgess
ATTORNEY

United States Patent Office 2,898,869
Patented Aug. 11, 1959

2,898,869

NARROW GAUGE RAILWAY TRUCK

Julius J. Zach, St. Louis, Mo., assignor to General Steel Castings Corporation, Granite City, Ill., a corporation of Delaware Application November 6, 1956, Serial No. 620,700

8 Claims. (Cl. 105—190)

The invention relates to railway vehicle trucks and consists particularly in trucks especially adapted for narrow gauge cars having relatively low underframes.

In cars designed for operation on narrow gauge tracks—usually of three feet, one meter, or three feet six inches, there are two factors which militate against the use of truck structures of the types adapted to standard and broad gauge equipment. The first factor is that, because of the narrowness of the track, the ratio of car body width to track gauge must be much greater than the corresponding ratio on standard or broad gauge equipment, in order to provide adequate space within the car body for passengers or lading. The second factor results from the first, and is the fact that the high ratio of body width to track gauge requires that the center of gravity of the car be kept as near the track as possible; this obviously necessitates the use of a very low underframe.

In the past, it has usually been the practice in narrow gauge service to use trucks of identical design with the standard gauge trucks, the trucks being scaled down in size to accommodate both the lower floor height and reduced track gauge. Such trucks have usually consisted of a pair of wheel and axle assemblies, longitudinally extending equalizers supported on the ends of the axles, a frame consisting of longitudinally extending wheel pieces spring-supported on the equalizers and connected to each other by transversely extending transom structure, a spring plank transversely swingably-supported from the frame inboard of the wheel pieces, and a body supporting bolster also entirely inboard of the wheel pieces, spring supported on the spring plank. Because of the exceedingly narrow spacing between the spring supports of the bolster, necessitated by the narrow spacing of the wheel pieces from each other transversely of the truck, the conventional bolster suspension did not provide the stability transversely of the truck desirable to resist overturning forces, and operation of narrow gauge passenger trains at high speeds, particularly on curves, has been severely restricted for this reason. The difficulty of increasing the transverse spacing of the bolster supports to provide greater lateral stability is readily apparent with regard to narrow gauge trucks, since the low floor height of most narrow gauge cars does not permit adequate vertical spacing between the usual drop equalizer and the wheel piece to accommodate the bolster and spring plank and their combined vertical and lateral movements.

Accordingly, it is a principal object of the invention to provide an equalized lateral motion truck, especially adapted for narrow gauge service, having improved lateral stability as compared with conventional trucks, yet having no greater over-all height.

I achieve this and additional objects by providing, in a truck structure, drop equalizers having straight substantially horizontal intermediate spring-supporting portions at the lowest level permitted by railway clearances, wheel pieces depressed between the equalizer springs so as to permit equalizer springs of suitable height to be used while also permitting the bolster to extend outboard of the frame over the depressed portions of the wheel pieces. In one modification spring-supporting structure is supported from the wheel pieces by swing hangers mounted outboard of the wheel pieces and the bolster is spring supported on this structure. In another form the wheel pieces are provided with outwardly extending spring seat brackets, and the bolster is carried by springs seated on these brackets. In both forms, vertical clearance between the bottom of the wheel pieces and top of the equalizers is reduced as much as possible consistent with preventing interference between the spring-supporting structures and the top of the equalizers. To further minimize the overall height of the truck, the spring caps are fully recessed in the ends of the box section bolster.

Selected embodiments of the invention are shown in the drawings in which:

Figure 4 is a plan view of a second form of truck embodying the invention.

Figure 5 is an elevation view of the truck shown in Figure 4.

Figure 1:
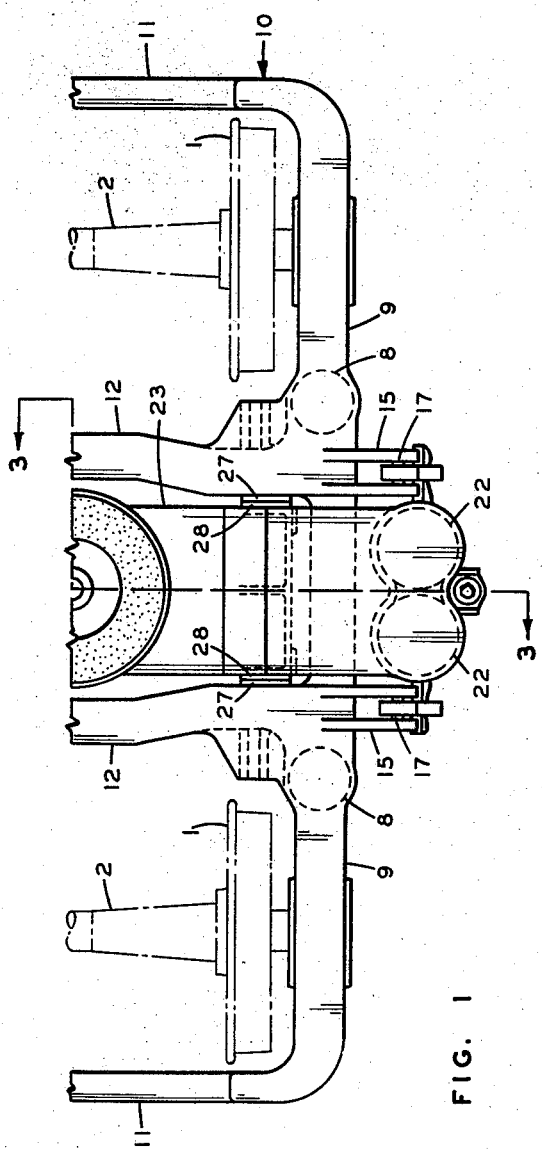
Figure 1 is a plan view of a truck embodying the invention.
Figure 2:
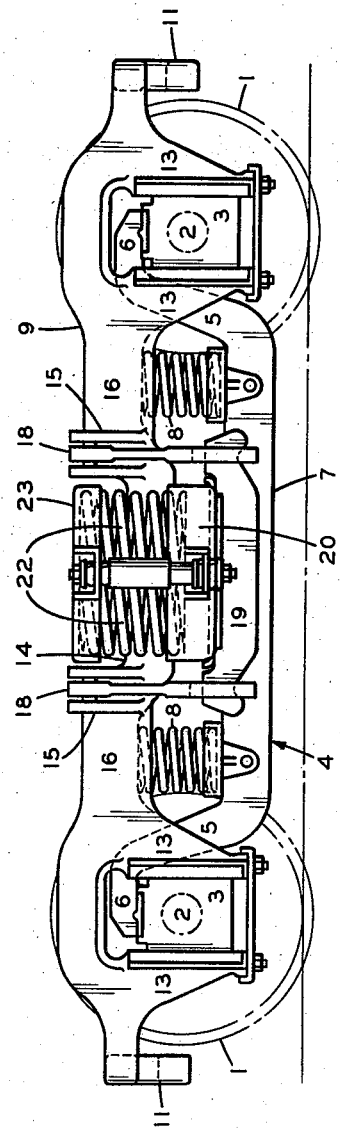
Figure 2 is an elevation view of the truck shown in Figure 1.
Figure 3:
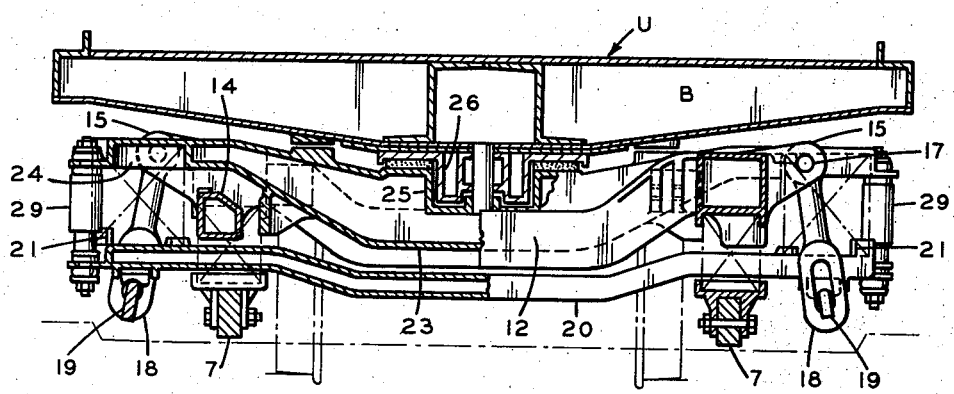
Figure 3 is a transverse vertical sectional view along the line 3—3 of Figure 1.
Figure 6:
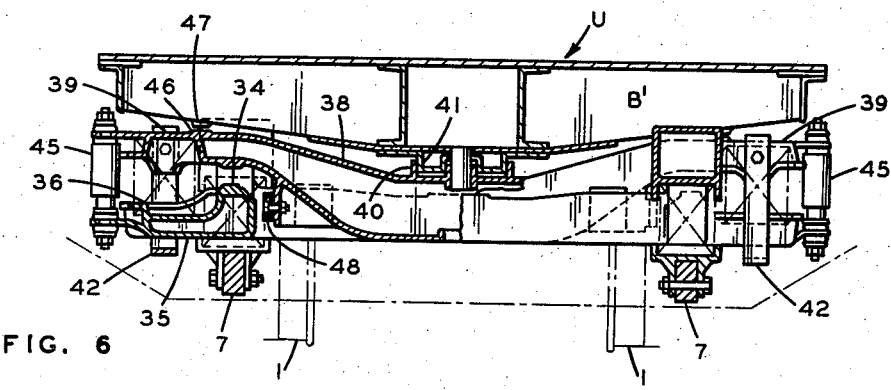
Figure 6 is a transverse vertical sectional view along the line 6—6 of Figure 4.

The truck shown in Figures 1–3 includes the usual wheels 1, axles 2, journal boxes 3 rotatably mounted on the ends of axles 2, and longitudinally extending equalizers 4 comprising upstanding end portions 5 having rebent terminals 6 seated on the tops of journal boxes 3, and a straight longitudinally-extending intermediate portion 7 connecting upstanding end portions 5. Longitudinally spaced vertically disposed coil springs 8 are seated on the top of intermediate portion 7 of each of the equalizers near the upstanding end portions 5, and longitudinally extending wheel pieces 9, of a frame generally indicated at 10, and including transverse end transoms 11 and intermediate transoms 12, are supported on springs 8. Adjacent the axle locations wheel pieces 9 are formed with depending pedestal legs 13 spaced apart from each other longitudinally of the truck, between which are vertically slidably received journal boxes 3. It should be noted at this point that the bottom of equalizers 4 is at the lowest level permitted by railway clearances as shown by the fragmentary clearance line on Figure 3, and that no part of the frame 10 extends upwardly higher than the top of the wheels. Intermediate springs 8, wheel pieces 9 are depressed as at 14, and on each side of the depressed portion 14 outwardly extending brackets 15 are formed on the higher level portions 16 of wheel pieces 9 for pivotally supporting, at 17, a pair of transversely swingable hangers 18 spaced apart from each other longitudinally of the truck. The lower ends of the hangers are connected by longitudinally extending cross bars 19 on which are supported the ends of a transversely extending spring plank 20. The end portions of spring plank 20 extend horizontally inwardly at a level sufficiently below the lower surface of wheel piece depressed portions 14 to permit normal swinging movements of the spring plank without interference from the wheel pieces, and at a level sufficiently above equalizer intermediate portions 7 to accommodate full compression of the equalizer springs. Thus it will be seen that the truck structure up to and including the wheel pieces is as compact vertically as possible consistent with normal functioning of the parts.

At its outer ends spring plank 20 is upstandingly flanged as at 21 to form seats for longitudinally-spaced vertically disposed bolster-supporting coil springs 22. A bolster 23 of box-section construction extends transversely of the truck over depressed portions 14 of the wheel pieces and at its ends its bottom wall is cut away as at 24 to form caps for bolster-supporting springs 22, the upper wall of the bolster being seated directly on the springs. Bolster 23 extends inwardly substantially horizontally from its end portions, to wheel pieces 9, and is inclined transversely inwardly and downwardly therefrom to conform to the contour of body bolster B, the transversely intermediate portion of truck bolster 23 being substantially horizontal and formed with a central bearing 25 pivotally supporting the underframe U through co-operating body central bearing 26. It should be noted at this point that by virtue of the recessed wheel pieces and the provision of recessed spring caps in bolster 23, the top of bolster 23 is no higher than the highest portion of the wheels and accordingly permits the lowest possible location of underframe U. In this connection the portion of the bolster overlying the wheel pieces is vertically spaced from the wheel pieces a distance sufficient only to accommodate the maximum compression of bolster springs 22, and the inward upper corners of the box section wheel pieces are beveled to accommodate the maximum vertical and transverse movement thereover of the inclined bottom walls of bolster 23.

For damping lateral movements of the bolster and for transmitting longitudinal movements between bolster and frame, co-operating wear plates 27 and 28 are fixed respectively to opposing faces of intermediate transoms 12 and of bolter 23, inboard of the wheel pieces 9 and at substantially the same level as the mating cylindrical portions of central bearings 25 and 26. The ends of spring plank 20 and bolster 23 are connected by vertically disposed friction snubbing devices 29 by means of which vertical oscillations of bolster-supporting coil springs 22 are damped.

It is evident from the foregoing that the truck described offers the greatest lateral stability and the lowest underframe height achievable by an equalized swing motion truck.

In the second form of the invention shown in Figures 3-6 a frame comprising wheel pieces 30, end transoms 31, intermediate transoms 32, and depending pedestal legs 33, is yieldably supported by means of springs 8 on the horizontal, straight longitudinally-extending intermediate portions 7 of drop equalizers 4 which in turn are supported on wheel and axle assemblies 1, 2 in the manner described in connection with the construction shown in Figures 1-3. Intermediate springs 8, wheel pieces 30 are depressed as at 34, the depressed portions 34 being of the usual box section and each formed with an outwardly extending bracket 35 upstandingly flanged as at 36 to form seats for bolster coil springs 37. A transversely extending bolster 38, of box section, the end portions of which are upwardly recessed as at 39 to form spring caps is supported at 39 on coil springs 37. Bolster 38 extends inwardly horizontally to the wheel pieces 30 and is then inclined transversely inwardly and downwardly to conform to the contour of body bolster B'. The intermediate portion of bolster 38 is substantially horizontal and supports a center plate 40 which pivotally supports body underframe U through co-operating body center plate 41.

For preventing separation between the bolster and frame, U-shaped members 42 are secured near their terminals to the ends of the bolster, with their horizontal portions underlying bracket 35.

For damping lateral movements of the bolster and transmitting longitudinal movements between bolster and frame, wear plates 43 and 44 are secured to opposing faces of transoms 32 and the bolster, respectively. Vertical damping of bolster movements is provided by vertically disposed friction snubbers 45, secured at their lower ends to brackets 35 and at their upper ends to the bolster ends.

The usual co-operating truck and body side bearings 46 and 47 are provided on the truck bolster 38 and body bolster B', respectively, outboard of the wheel pieces whereby to restrict lateral tilting of the underframe U. Transverse movements of the bolster relative to the frame are limited and cushioned by rubber bumpers 48 attached to brackets on the bolster inboard of the wheel pieces, bumpers 48 being adapted to engage the inner vertical surface of the wheel pieces when the desired limit of lateral movement is reached.

It will be seen from the foregoing that the truck structure shown in Figures 3-6 also provides the maximum lateral stability attainable, in fully equalized lateral motion truck adapted to the low floor height prevalent in narrow gauge passenger equipment.

It will be understood that the details of the construction may be varied from the forms shown without departing from the spirit of the invention, and the exclusive use of those modifications coming within scope of the appended claims is contemplated.

What is claimed is:

1. In a railway vehicle truck, a pair of wheels and axle assemblies, longitudinally extending equalizers having straight normally horizontal intermediate portions and upturned end portions supported on said assemblies, a plurality of upright springs carried by said intermediate portions immediately adjacent said upturned end portions, said springs being spaced from each other longitudinally of said equalizers, said spring-supporting intermediate portions being disposed entirely below the level of the axles and at the lowest level permitted by railway clearances, a truck frame disposed entirely below the level of the tops of the wheels and including wheel pieces supported on said springs, the portion of each wheel piece between said spaced springs being at a lower level than the portions immediately above said springs whereby to provide adequate vertical space for said springs, spring-supporting structures supported from said wheel pieces outwardly thereof and spaced above said equalizers a distance at least as great as the maximum permissible deflection of said springs whereby to accommodate such vertical movements of said wheel pieces and said spring-supporting structures relative to said equalizers as are permitted by said springs, additional springs carried by said structures, and a laterally movable bolster disposed entirely below the level of the top of said frame and extending transversely of the truck over the lower-level portions of said wheel pieces and supported at its ends on said additional springs, said bolster having shallow box-section end portions upwardly recessed to receive the upper ends of said additional springs, the portion of said bolster laterally inwardly of said side members being at a substantially lower level than the bolster end portions and mounting a pivot bearing adapted to support a railway vehicle body.

2. A railway vehicle truck according to claim 1 in which said additional springs are of the coil type, and including vertical snubbing devices connected to said spring-supporting structures and said bolster for damping oscillations of said additional springs.

3. A railway vehicle truck according to claim 1 in which said spring-supporting structures constitute the end portions of a transversely extending spring plank, and pendent transversely swingable links support said spring plank from said wheel pieces.

4. A railway vehicle truck according to claim 1 in which the spring-supporting structures are brackets rigid with the wheel pieces, movements of the bolster transversely of the frame being permitted by lateral deflections in said additional springs.

5. A railway vehicle truck according to claim 3 in which said links are pivotally supported from the outer sides of said wheel pieces.

6. A railway vehicle truck according to claim 3 in which the upper ends of said links are at as low a level as the highest portions of said wheel pieces.

7. A railway vehicle truck according to claim 1 in which said wheel pieces include near each of their ends a pair of longitudinally-spaced depending vertical pedestal legs, a journal box rotatably mounted on each end of both said assemblies, and being vertically slidably received between each pair of said legs, said equalizer upturned end portions having horizontal terminal portions supported on said boxes, said first-named springs being positioned between said lower-level portion of each wheel piece and an adjacent pedestal leg.

8. A railway vehicle truck according to claim 1 in which said spring-supporting structures are the end portions of a transversely extending spring plank, there being transversely swingable link structure pivotally supported from the outside portions of said wheel pieces, said link structures each including a pair of vertical members spaced apart longitudinally of the truck and a horizontal member connecting their lower extremities, and underlyingly supporting the ends of said spring plank, said horizontal members being normally at substantially the same height as the intermediate portions of said equalizers.

References Cited in the file of this patent

UNITED STATES PATENTS

| | | |
|---|---|---|
| 507,050 | Taylor | Oct. 17, 1893 |
| 2,434,287 | Pflager | Jan. 13, 1948 |
| 2,492,337 | Travilla | Dec. 27, 1949 |
| 2,592,700 | Jackson | Apr. 15, 1952 |
| 2,741,996 | Kolesa | Apr. 17, 1956 |
| 2,770,200 | Dilworth et al. | Nov. 13, 1956 |
| 2,831,440 | Lich | Apr. 22, 1958 |